United States Patent [19]

Böhner et al.

[11] Patent Number: 4,741,230
[45] Date of Patent: May 3, 1988

[54] APPARATUS FOR FACING AND INTERNAL TURNING

[75] Inventors: Christian Böhner, Schlüsselfeld; Harold Gähr; Gerhard Wohlhaupter, both of Frickenhausen, all of Fed. Rep. of Germany

[73] Assignee: Emil Wohlhaupter & Co., Frickenhausen, Fed. Rep. of Germany

[21] Appl. No.: 886,191

[22] Filed: Jul. 15, 1986

[30] Foreign Application Priority Data

Jul. 26, 1985 [DE] Fed. Rep. of Germany ....... 3526712

[51] Int. Cl.$^4$ .......................................... B23B 41/00
[52] U.S. Cl. ............................................ 82/1.2; 82/2 E
[58] Field of Search ............... 82/1.2, 1.4, 2 B, 2 E; 408/11, 13, 16; 409/186, 187, 193, 194; 33/125 A, 125 C, 559, 561; 356/373, 374, 375; 250/231 SE

[56] References Cited

U.S. PATENT DOCUMENTS

| 3,237,486 | 3/1966 | Gilbert et al. | 82/1.2 |
| 3,710,659 | 1/1973 | Pagella et al. | 82/1.2 |
| 3,744,352 | 7/1973 | Scholl | 82/1.2 |
| 3,942,895 | 3/1976 | Meyer et al. | 356/373 |
| 4,236,070 | 11/1980 | Lee | 250/231 SE |
| 4,552,493 | 11/1985 | Schultshick | 408/13 |
| 4,561,776 | 12/1985 | Pryor | 356/375 |
| 4,577,535 | 3/1986 | Klabunde et al. | 82/2 E |
| 4,609,817 | 9/1986 | Mumzhiu | 250/231 SE |
| 4,612,833 | 9/1986 | Slee | 82/18 |

Primary Examiner—Fred Silverberg
Attorney, Agent, or Firm—Shenier & O'Connor

[57] ABSTRACT

An apparatus for facing and internal turning, comprising a rotating housing and at least one carriage bearing a cutting tool and being displaceable transversely to the axis of rotation, has a drive motor in the rotating housing for displacement of the carriage and a distance measurement mechanism for directly measuring the distance of displacement of the carriage in relation to the housing, measurement and supply lines hereby extending between rotating housing and a stationary evaluation and control unit and the measurement signals and energy supply being transferred at a transfer unit from those parts of the measurement and supply lines communicating with the rotating housing to those parts of those lines communicating with the stationary evaluation and control unit.

6 Claims, 3 Drawing Sheets

APPARATUS FOR FACING AND INTERNAL TURNING

BACKGROUND OF THE INVENTION

The invention relates to an apparatus for facing an internal turning, comprising a housing rotating about an axis of rotation, at least one carriage displaceable in a guideway transversely to the axis of rotation and cutting tools arranged on the carriage.

Apparatuses of this type serve primarily for facing, i.e. for truing flat surfaces, and the internal turning, i.e. making bores having predetermined, in particular recessed cross-sectional contours, with two NC axes.

In know apparatuses of this type, the displacement of the carriages bearing the cutting tools, which determines the radius of operation of the cutting tool and, in particular, the diameter of the bore to be cut, is brought about by a drive derived from the rotation of spindle, in which the apparatus for facing and internal turning is itself secured. In addition, it is known to displace the carriage by means of an axially dispalceable pressure rod with the aid of helical gearing, the pressure rod hereby extending coaxially to the axis if rotation of the apparatus. It is also known to displace the carriage by means of a special electric motor which is arranged outside the rotating housing of the apparatus in a separate casing.

In order to adjust the carriages and the cutting tools borne thereby as accurately as possible it is necessary to measure exactly the distance each carriage is displaced. This distance is measured in all known apparatuses for facing and internal turning in an indirect manner. For example, the rotation, i.e. the angular distance, of a shaft which drives the carriages is measured and the distance travelled by the carriages deduced therefrom. Inaccuracies may, however, occur during distance measurement, for example due to unavoidable tolerances, and these inaccuracies have a negative influence on the exact positioning of the cutting tools and on the repeatability of a setting. A further disadvantage of the known apparatus for facing and internal turning is to be seen in the fact that the drive means which are arranged outside the rotating housing of the apparatus and provided for displacement of the carriages are complicated and bulky which has an unfavourable effect on the machining performance to be attained with this apparatus.

SUMMARY OF THE INVENTION

The object of the invention is to equip an apparatus of the type in question for facing and internal turning with means for direct measurement of displacement and to ascertain each position of the carriage or carriages in the rotating housing of the apparatus by direct reading. The invention is also intended to improve the machining performance of the apparatus for facing and internal turning.

The object of the invention is accomplished by the following features:

A. A drive motor arranged in the rotating housing for displacing the carriage;

B. measuring means provided in the housing for direct measurement of the distances of displacement of the carriage relative to the housing;

C. an evaluation and control unit stationarily arranged outside the rotating housing for evaluating the results of distance measurement and for controlling the drive motor;

D. measurement and supply lines between the rotating housing and the stationary evaluation and control unit;

E. a transfer unit arranged in the measurement and supply lines for transferring the measurement signals and supply of energy from those parts of the measurement and supply lines communicating with the rotating housing to those parts of these lines communicating with the stationary evaluation and control unit.

Displacement is hereby measured directly at the carriages in the rotating housing and this considerably increases the accuracy of positioning and its repeatability. Positioning can be so exact that working or machining is possible to an accuracy within the $\mu m$ range. The drive motor for the carriage is not accommodated in a separate stationary housing but in the rotating housing itself and this means that the entire apparatus for facing and internal turning can be inserted into bores and this will increase the depth of such bores. Finally, the installation of the carriage motor in the rotating housing results in a compact and stable type of construction which leads to a considerable improvement in machining performance in comparison with known apparatuses.

BRIEF DESCRIPTION OF THE DRAWINGS

The following description of a preferred embodiment of the invention serves to explain the invention in more detail in conjunction with the attached drawings, in which.

DESCRIPTION OF THE PREFERRED EMBODIMENTS

Figure 1:
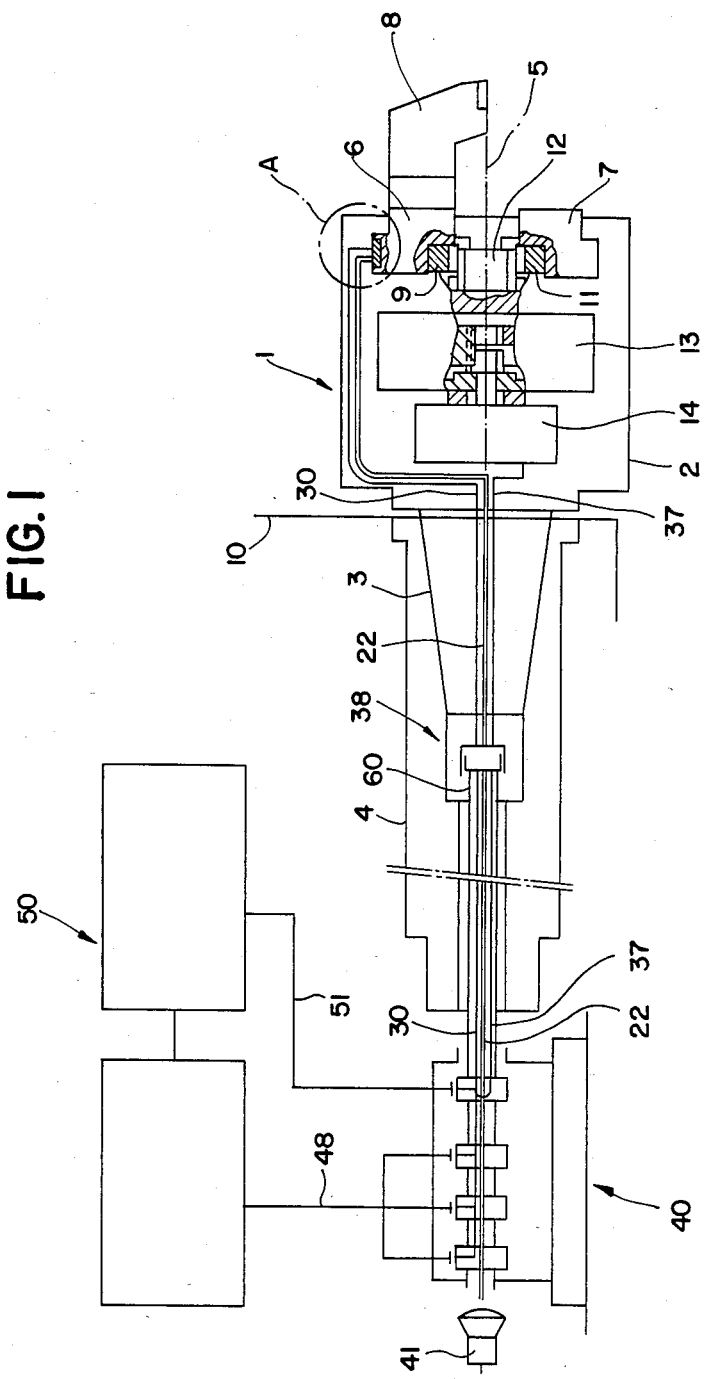
FIG. 1 is a schematic general illustration of an apparatus for facing and internal turning having direct measurement of displacement.

FIG. 1 is a schematic illustration of an apparatus 1 for facing and internal turning. The apparatus 1 comprises a housing 2 which may be clamped in a manner known per se in a rotary driven chucking device 4 of a machine tool by means of a conical journal 3 integrally disposed on the housing. In this way the housing may be caused to rotate about an axis of rotation 5. The outline of the machine tool is schematically indicated in FIG. 1 by the line 10.

The rotating housing 2 includes two carriages 6,7 displaceable in sliding or rolling guideways at right angles to the plane of drawing in FIG. 1. Cutting tools 8 may be secured to the carriages in a manner known per se. These cutting tools serve for truing flat workpiece surfaces or the internal turning of bores when the housing 2 rotates, the machining diameter attainable each time being determined by the distance the carriages 6, 7 may be displaced in relation to a zero position.

The carriages 6, 7 each have a toothed rack 9 and 11, respectively, on their facing sides. These toothed racks are rigidly connected to the relevant carriage and extend parallel to the direction of displacement of the carriages. A pinion 12 engages the toothed racks 9, 11 and is driven by a drive motor 14 via a gear unit 13. This guarantees that the carriages 6, 7 are displaced together in opposite directions to one another over a predetermined distance. The gear unit 13 with the pinion 12 and the drive motor 14 are rigidly disposed in the rotating housing 2.

In the illustrated embodiment, two carriages 6, 7 which may each carry one or more cutting tools 8 are arranged on the rotating housing 2. It would, in principle, be sufficient to provide only one carriage and cutting tool driven by the pinion 12. The apparatus equipped with two carriages may also be operated such that only one carriage is equipped with a cutting tool 8.

The drive motor 14 is designed as an electric motor.

Figure 2:
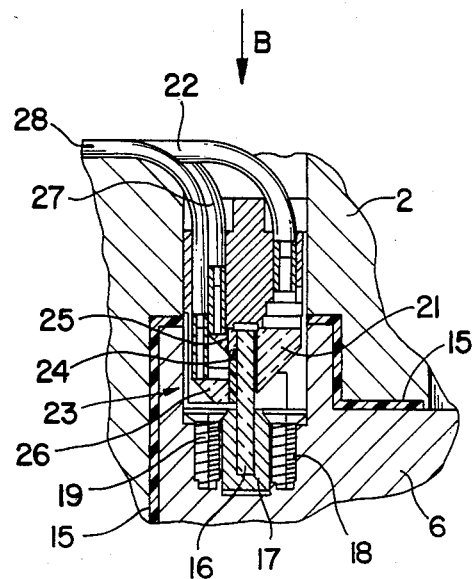
FIG. 2 is a sectional view in region A of FIG. 1 of a carriage having direct measurement of displacement.
Figure 3:
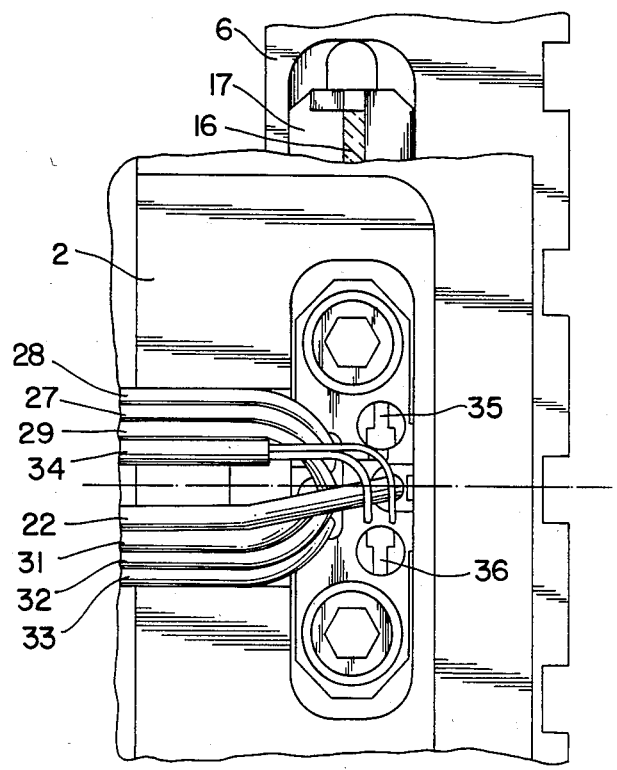
FIG. 3 is a view in the direction of arrow B in FIG. 2.

FIGS. 2 and 3 show means for direct measurement of the set position of the carriages 6, 7 and the distance travelled by the carriages during displacement. As illustrated, the sliding guideway of the carriage 6, which extends at right angles to the plane of drawing in FIG. 2 (the same applies for the other carriage 7), is provided with a slide covering 15. A suitable covering may, for example, be made of a twin-component synthetic resin on an epoxy resin basis. The covering not only absorbs knocks and vibrations but, in particular, enables the carriages to be displaced small distances without such movement being jerky.

A glass scale 16 with a mounting 17 is rigidly connected to the carriage 6 in that the mounting 17 is screwed to the carriage 6 by screws 18, 19. The incremental glass scale which is known per se extends exactly parallel to the direction of displacement of the carriage 6 and has a division scale which is very finely subdivided in a manner known per se. A prism 21 is stationarily disposed in the housing 2 at a sh-ort distance from one side of the glass scale 16. This prism communicates with a supply light conductor 22. The glass scale 16 may therefore be lit from a light source to be described later on, via the light conductor 22 and the prism 21.

A scanning device 23 which is known per se is also stationarily disposed in the housing 2 on the opposite side of the glass scale 16 to the prism 21. The arrangement 23 comprises a scanning element 24 arranged closely to the facing side of the glass scale 16. In the illustrated embodiment, this element is designed as a so-called graduated plate and has a large number of lines arranged very close to one another. Four light signals result in the known manner at the scanning element 24 (graduated plate) and these signals are passed to a transfer unit, which is to be described later on, in a predetermined sequence as sine half waves via prisms 25, 26 and light wave conductors 27 to 30.

FIG. 2 merely illustrates two measurement lines (light conductors 27, 28). Altogether, six light conductors are arranged on the scanning element designed as a graduated plate. These are designated in FIG. 3 by the reference numerals 27 to 33 and convey the light half waves received to the tranfer unit mentioned above. Four measurement lines are required for measuring the distance. Two additional lines serve to relay a reference pulse.

The measurement arrangement described avoids the use of a light source accommodated in the rotating housing 2 itself and no electro-optical elements which convert the light signals received into electrical signals are present in this housing 2. It has been established that the susceptability of the measuring equipment in the housing 2 to interference is thereby considerably reduced. The light conductors also avoid, in a manner still to be described, the necessity of passing weak electrical measurement signals over rotating slip rings. It would, however, be fundamentally possible to provide a light source in the housing 2.

It is unnecessary to go into greater detail on the design and mode of operation of the means used in this case for direct optical measurement of distance as such means are known per se. The measurement signals are also evaluated in a manner known per se.

The measurement lines 27 to 33 designed as light conductors may, like the supply line 22, be designed as light-conductive fiber cables. These lines are preferably constructed as polymer cables not having any sheath which means that light conductors having a maximum diameter may be used in the rather limited space.

FIG. 3 also shows an electric supply line 34 leading to the carriage 6. This line has a plurality of core leads leading to limit switches 35, 36 rigidly disposed in the housing 2. These limit switches serve to switch off the drive motor 14 automatically when the carriage 6 has been displaced through the maximum distance possible.

A further electric supply line 37 (FIG. 1) leads from a control unit still to be described to the drive motor 14 arranged in the rotating housing 2. All the light measurement lines 27 to 33 are schematically illustrated under reference numeral 30 in FIG. 1. The supply light conductor 22 is indicated in FIG. 1 by a thick line. The measurement and supply lines 22, 30, 37 lead within the journal 3 of the housing 2 to a coupling unit 38 where they end, for example, in sockets. The chucking device 4 (rotating spindle of the machine tool 10) comprises complementary parts, for example plugs, in the region of the coupling unit 38 and these parts fit into the sockets of the journal 3. The plugs are connected to lines which represent corresponding continuations of the measurement and supply lines from the housing 2. These measurement and supply lines 22, 30, 37 finally exit from the chucking device 4 at the end located on the left in FIG. 1. The coupling unit 38 enables the housing 2 of the apparatus to be easily interchanged at the chucking device 4.

The measurement and supply lines exiting from the chucking device 4, which come from the housing 2 and all rotate with the housing 2 in relation to the axis of rotation 5, are finally introduced into a transfer unit 40. The purpose of this unit is to transfer electrical and optical energy between stationary and rotating lines.

As illustrated, the supply light conductor 22 extends centrally in such a manner that its axis coincides with the axis of rotation 5 of the apparatus. Consequently, it is sufficient to arrange a stationary light source 41 facing the free end of the conductor 22 for the purpose of feeding a supply of light energy to this conductor 22. This is also illustrated in FIG. 4 where the light conductor 22 runs through a rigid sleeve 42 rotatably mounted in a roller bearing 43.

Figure 4:
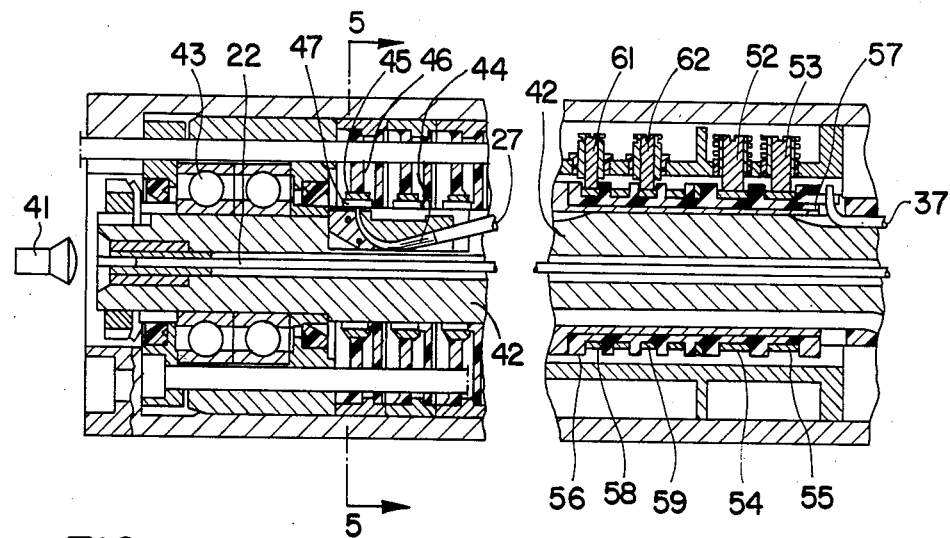
FIG. 4 is a sectional view of a transfer unit for transferring signals and supply of energy between rotating and stationary measurement and supply lines and FIG. 5 is a cross-sectional view along line 5—5 in FIG. 4.
Figure 5:
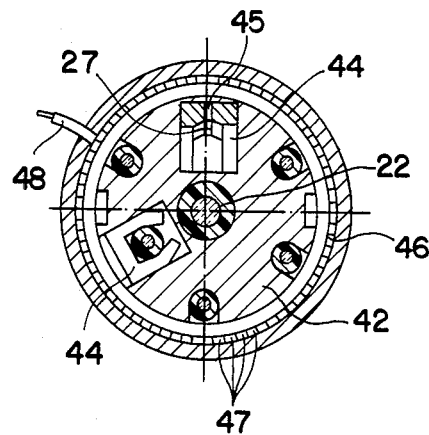

Of the measurement light conductors 27 to 33 illustrated in FIGS. 2 and 3 only the light conductor 27 is shown in FIG. 4. The remarks made in the following with regard to this light conductor 27 apply analogously for the remaining light conductors 28 to 33. The light conductor 27 is guided and held on the sleeve 42 by a cable shoe 44 such that it is deflected through approximately 90° and its end face 45 is practically parallel to the inner surface of a ring 46 stationarily arranged in the transfer unit 40. The light energy emerging from the end face 45 of the light conductor 27 therefore impinges upon the inner face of the stationary ring 46.

The inner face of the ring 46 is formed by photoelectric cells 47 or other photoelectric elements arranged close to one another. These cells are connected in parallel and to a common line 48. The line 48 leads (cf. FIG. 1) to a stationary evaluation and control unit 50 in which the light signals received are evaluated in a manner known per se.

The evaluation and control unit 50 also serves to supply energy in particular for the drive motor 14 in the rotating housing 2. This energy is supplied via lines designated as a whole as 51 in FIG. 1.

The supply lines for the drive motor 14 are connected in a manner known per se to stationary sliding contacts 52, 53 (FIG. 4) which are in sliding contact with slip rings 54, 55. The slip rings 54, 55 are secured to the rotating sleeve 42 through the intermediary of an electrically insulating layer 56. The slip rings 54, 55 are connected in a manner known per se to the supply lines of the drive motor 14, for example and as illustrated in FIG. 4, by the end of the supply line 37 being soldered to a soldering lug 57 of the slip ring 55. The same applies for the slip ring 54. The sleeve 42 bears, through the intermediary of the insulating layer 56, additional slip rings 58, 59 rotating with this sleeve and interacting with additional sliding contacts 61, 62. This provides the connection to the supply line 34 (FIG. 3) leading to the limit switches 35, 36.

Apart from the supply lines 34, 37 described, additional supply lines may be provided between the evaluation and control unit 50 and the rotating housing 2. These lines may serve, for example, as connection to a tacho-alternator accommodated in the housing 2. This supplies additional measuring signals for the control and evaluation of the apparatus for facing and internal turning.

In the region of the chucking device 4 (machine spindle), the lines 22, 30 and 37 of the preferred embodiment of the invention are guided in a schematically illustrated connecting or coupling bar 60 which rotates about the axis of rotation 5 together with the chucking device 4.

This bar is designed as a tube; it encloses and protects the said lines. The bar is axially displaceable in the chucking device 4 and can therefore provide the final electrical coupling between the relevant line parts and the coupling unit 38. The connecting and coupling bar may also be guided in a draw bar which is also hollow in construction, is arranged in the chucking device 4 so as to be axially displaceable and rotatable and serves to provide a non-rotatable connection between the conical journal 3 and the chucking device 4.

What is claimed is:

1. An apparatus for facing an internal turning, comprising a housing rotatable about an axis of rotation; at least one carriage displaceable in a guideway transversely to said axis of rotation; cutting tools arranged on said carriage; a drive motor arranged in the rotatable housing for displacing the carriage; measuring means provided in the housing for direct measurement of the distances of displacement of said carriage relative to said housing; an evaluation and control unit stationarily arranged outside the rotatable housing for evaluating the results of distance measurement and for controlling the drive motor; meausurement and supply lines between the rotatable housing and the stationary evaluation and control unit; said measurement and supply lines being connected to said measuring means and said motor and a transfer unit arranged in the measurement and supply lines for transferring the measurement signals and supply of energy from those parts of the measurement and supply lines communicating with the rotatable housing to those parts of said lines communicating with the stationary evaluation and control unit, said distance measuring means comprising a glass scale rigidly connected to the carriage and at least one scanning element rigidly connected to the housing, said glass scale being lit from a light source provided outside the housing via a first or supply light conductor, the light signals from the glass scale being conveyed directly to additional or measurement light conductors at the scanning element, and said transfer unit having a stationary ring including a photoelectrically effective interior surface for each measurment light conductor, the light exit ends of said measurement light conductors travelling past said interior surface when the housing rotates, to introduce light signals continuously into said photoelectrically effective interior surface.

2. Apparatus as defined in claim 1, characterized in that a gear unit (13) is arranged between drive motor (14) and carriage (6).

3. Apparatus as defined in claim 2, characterized in that the light source (41) is arranged in the transfer unit (40) so as to be centered over the light entry end of the supply light conductor (22) leading to the glass scale (16).

4. Apparatus as defined in claim 2, characterized in that a plurality of individual photoelectric cells (47) are arranged next to one another and with practically no gaps therebetween on the inner side of the ring (46).

5. Apparatus as defined in claim 2, characterized in that the measurement and supply lines (22, 30, 37) are enclosed by a tubular connecting rod (60).

6. Apparatus as defined in claim 1, characterized in that the tubular connecting rod (60) is centrally arranged in the middle of the apparatus and has a coupling unit (38).

* * * * *

UNITED STATES PATENT AND TRADEMARK OFFICE
CERTIFICATE OF CORRECTION

PATENT NO. : 4,741,230
DATED : May 3, 1988
INVENTOR(S) : Christian Bohner, Harold Guhr and Gerhard Wohlhaupte It is certified that error appears in the above-identified patent and that said Letters Patent are hereby corrected as shown below:

Column 6, line 13 - "meausurement" should be --measurement--.

Column 6, line 52 - "1" should be --5--.

Signed and Sealed this

Thirtieth Day of August, 1988

Attest:

DONALD J. QUIGG

*Attesting Officer*     *Commissioner of Patents and Trademarks*